United States Patent
Sherman et al.

(10) Patent No.: US 12,229,278 B2
(45) Date of Patent: *Feb. 18, 2025

(54) COMPUTATIONAL RISK ANALYSIS AND INTERMEDIATION

(71) Applicant: Valente Sherman, Inc., Oakland, CA (US)

(72) Inventors: Russell Sherman, Oakland, CA (US); Paul Valente, Oakland, CA (US)

(73) Assignee: Valente Sherman, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,810

(22) Filed: Nov. 29, 2023

(65) Prior Publication Data

US 2024/0095373 A1 Mar. 21, 2024

Related U.S. Application Data

(63) Continuation of application No. 17/337,678, filed on Jun. 3, 2021, now Pat. No. 11,868,480, which is a
(Continued)

(51) Int. Cl.
*H04L 29/00* (2006.01)
*G06F 21/56* (2013.01)
(Continued)

(52) U.S. Cl.
CPC .......... *G06F 21/577* (2013.01); *G06F 21/561* (2013.01); *G06Q 10/0635* (2013.01)

(58) Field of Classification Search
CPC .. G06F 21/577; G06F 21/561; G06Q 10/0635
(Continued)

(56) References Cited

U.S. PATENT DOCUMENTS

| 8,141,157 B2 | 3/2012 | Farley et al. |
| 8,396,890 B2 * | 3/2013 | Lim ..................... G06F 21/6218 707/781 |

(Continued)

OTHER PUBLICATIONS

U.S. Appl. No. 15/720,271, Advisory Action (Ptol-303), Jul. 7, 2020, 2 pgs.
(Continued)

*Primary Examiner* — Brandon Hoffman
*Assistant Examiner* — Michael D Anderson
(74) *Attorney, Agent, or Firm* — Kwan & Olynick LLP

(57) ABSTRACT

Provided are mechanisms and processes for computational risk analysis and intermediation. Security practices information characterizing security measures in place at a first computing system may be received from the first computing system via a network. Computing services interaction information characterizing data transmitted from a second computing system to the first computing system may be received from the second computing system via the network. A processor may determine a risk profile for the first computing system based on the security practices information. Based on the risk profile and the computing services interaction information, the processor may then determine an estimate of the information security risk associated with transmitting the data from the second computing system to the first computing system. A risk assessment message including the estimate of the information security risk may be transmitted to the second computing system.

20 Claims, 6 Drawing Sheets

Related U.S. Application Data continuation of application No. 15/720,271, filed on Sep. 29, 2017, now Pat. No. 11,055,415.

(51) Int. Cl.
*G06F 21/57* (2013.01)
*G06Q 10/0635* (2023.01)

(58) Field of Classification Search
USPC .......................................................... 726/25
See application file for complete search history.

(56) References Cited

U.S. PATENT DOCUMENTS

| | | | |
|---|---|---|---|
| 11,055,415 B2 | 7/2021 | Sherman et al. | |
| 11,868,480 B2 | 1/2024 | Sherman et al. | |
| 2004/0093324 A1 | 5/2004 | Marappan | |
| 2008/0148364 A1* | 6/2008 | Hopen | G06F 21/6218 726/4 |
| 2021/0286882 A1 | 9/2021 | Sherman et al. | |

OTHER PUBLICATIONS

U.S. Appl. No. 15/720,271, USPTO e-Office Action: CTFR—Final Rejection, Mar. 16, 2020, 19 pgs.
U.S. Appl. No. 17/337,678, USPTO e-Office Action: CTFR—Final Rejection, Mar. 16, 2023, 24 pages.
U.S. Appl. No. 17/337,678, USPTO e-Office Action: CTNF—Non-Final Rejection, Aug. 30, 2022, 11 pages.
U.S. Appl. No. 17/337,678, USPTO e-Office Action: NOA—Notice of Allowance and Fees Due (Ptol-85), Aug. 30, 2023, 9 pages.
U.S. Appl. No. 15/720,271, Notice of Allowance mailed Mar. 3, 2021, 10 pgs.
Paul Rohmeyer, Tal Ben-Zvi/ Managing Cloud Computing Risks in Financial Service Institutions/2015/pp. 519-526 (Year: 2015).
Raluca Radu, Christian Sandescu, Octavian Grigorescu, Razvan Rughinus/ Anayzing Risk Evaluation Frameworks and RiskAssesment Methods/2021/ IEEE/pp. 1-6 (Year: 2021).

\* cited by examiner

COMPUTATIONAL RISK ANALYSIS AND INTERMEDIATION

CROSS-REFERENCE TO RELATED APPLICATIONS

This application is a continuation of U.S. patent application Ser. No. 17/337,678 entitled: "COMPUTATIONAL RISK ANALYSIS AND INTERMEDIATION" filed on Jun. 3, 2021, which is a continuation of U.S. patent application Ser. No. 15/720,271 entitled: "COMPUTATIONAL RISK ANALYSIS AND INTERMEDIATION" filed on Sep. 29, 2017, now U.S. Pat. No. 11,055,415, issued on Jul. 6, 2021, which are incorporated herein by reference in their entirety for all purposes.

TECHNICAL FIELD

The present disclosure relates to algorithmic computing and in particular techniques for automated risk analysis.

DESCRIPTION OF RELATED ART

Data security is of paramount importance in the information age. Firms that experience a data security breach often face both negative publicity and considerable liability. A firm's relationships with outside vendors introduce security vulnerabilities. A firm may purchase a range of business-to-business services from vendors, such as services related to data analysis, marketing, human resources, business consulting, technical consulting, and software-as-a-service (SAAS). These service relationships often involve vendor-client data sharing (sometimes sensitive data) that exposes the client's data to risk of a security breach of the vendor's systems.

Managing security risks associated with client-vendor relationships presents a host of challenges. A responsible client must take steps to understand the security practices of a current or potential vendor so that the client can make a security risk assessment of that relationship. But a client can neither control nor necessarily observe a vendor's data security practices. Clients are left to rely on time-consuming manual approaches to investigate vendor security profiles. These investigations rely heavily on self-reporting (questionnaires) and internet research.

Many business employ or contract with one or more information security professionals who are tasked with conducting such investigations, and such information security professionals are a considerable expense. Accordingly, it is desirable to develop improved mechanisms and processes relating to computational approaches to determining vendor security practices and evaluating and intermediating risks associated with those practices.

Overview

Provided are various mechanisms and processes relating to performing feature identification and tagging using multi-view interactive digital media representations.

In one aspect, which may include at least a portion of the subject matter of any of the preceding and/or following examples and aspects, a computing system includes a communications interface configured to receive security practices information from a first computing system via a network, where the security practices information characterizes security measures in place at the first computing system. The communications interface is also configured to receive computing services interaction information from a second computing system via the network, where the computing services interaction information characterizes data transmitted from the second computing system to the first computing system. The communications interface is also configured to transmit a risk assessment message to the second computing system, where the risk assessment message includes an estimate of an information security risk associated with transmitting the data from the second computing system to the first computing system. The computing system also includes memory configured to store the security practices information and the computing services interaction information. The computing system also includes a processor configured to determine a risk profile for the first computing system based on the security practice information and to determine the estimate of the information security risk based on the risk profile and the computing services interaction information.

In another aspect, which may include at least a portion of the subject matter of any of the preceding and/or following examples and aspects, a procedure may involve receiving security practices information from a first computing system at a communications interface via a network, where the security practices information characterizes security measures in place at the first computing system. Computing services interaction information may be received at the communications interface from a second computing system via the network, where the computing services interaction information characterizes data transmitted from the second computing system to the first computing system. A risk profile for the first computing system may be determined at a processor based on the security practice information. Then, an estimate of an information security risk associated with transmitting the data from the second computing system to the first computing system may be determined based on the risk profile and the computing services interaction information. A risk assessment message may be transmitted to the second computing system, the risk assessment message including the estimate of the information security risk.

In another aspect, which may include at least a portion of the subject matter of any of the preceding and/or following examples and aspects, a non-transitory computer readable media may have instructions stored thereon for performing a procedure may involve receiving security practices information from a first computing system at a communications interface via a network, where the security practices information characterizes security measures in place at the first computing system. Computing services interaction information may be received at the communications interface from a second computing system via the network, where the computing services interaction information characterizes data transmitted from the second computing system to the first computing system. A risk profile for the first computing system may be determined at a processor based on the security practice information. Then, an estimate of an information security risk associated with transmitting the data from the second computing system to the first computing system may be determined based on the risk profile and the computing services interaction information. A risk assessment message may be transmitted to the second computing system, the risk assessment message including an estimate of the information security risk.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
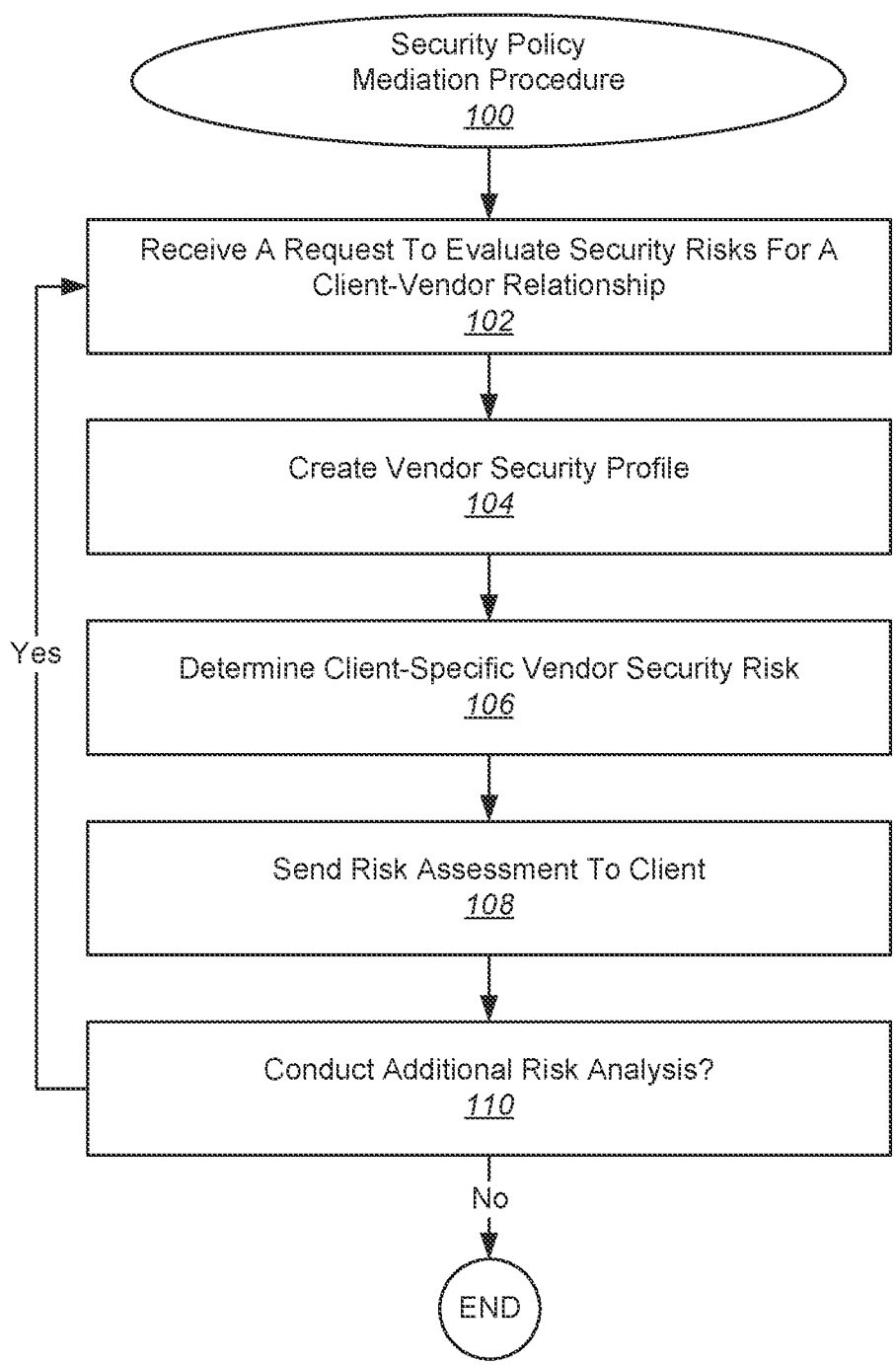
FIG. 1 illustrates an example of a process for performing security policy mediation, performed in accordance with various embodiments.

Reference will now be made in detail to some specific examples of the present disclosure including the best modes contemplated by the inventors for carrying out various embodiments of the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Many clients conduct a security due diligence investigation prior to entering into a business relationship with a vendor or contractor. In some cases, a due diligence analysis is mandated by compliance or regulatory considerations. For example, military contractors may be required to maintain and guarantee a designated level of security not only for their own operations but also for their subcontractors. As another example, private companies concerned about data breaches may seek to ensure that a data analysis, marketing, or advertising campaign vendor who has access to secure data takes the appropriate steps to keep the data secure.

Because of the many different types of clients and venders in business-to-business relationships and because of the many different types of business-to-business relationships, many different approaches to security due diligence are employed. In many situations, a client will require a vendor to answer a unique list of questions to help shed light on the vendor's security practices. However, such lists are often lengthy and time-consuming to answer, in many cases running to hundreds of questions in length. Further, such lists often fail to account for the specific type of interaction contemplated between the client and vendor and therefore include many irrelevant questions and/or fail to include significant questions.

In addition to the difficulties involved in eliciting security-relevant information, vendors and clients face problems of assurance and verification. For instance, a client who receives a security assessment from a vendor may have little ability to verify the accuracy of the provided information. At the same time, a client may have performed significant formal or informal auditing operations to evaluate, guarantee, or improve security but may be unwilling to provide open access to such records to every one of potentially many actual or prospective vendors.

According to various embodiments, techniques and mechanisms described herein provide for automated detection, analysis, evaluation, and intermediation of information security risk between clients and vendors. A security intermediation platform collects security information from and about each vendor that joins the platform. The security intermediation platform uses this information to construct a security profile about the vendor. The security intermediation platform can then dynamically evaluate client-specific vendor security risk based on both the vendor security profile and client-specific information.

In particular embodiments, a vendor need only establish a vendor security profile once, when the vendor initially joins the security validation system. Once this standardized vendor security profile is established, it may be used to evaluate risks to potentially many different clients wishing to engage the vendor to provide any of various types of services.

With reference to FIG. 1, shown is a procedure 100 for mediating security policies. According to various embodiments, the procedure 100 may be used by a security validation system to facilitate interactions between a client and a vendor. For instance, the procedure 100 may be used to identify data security features for a vendor and then to determine the risk to a particular client involved in employing that vendor.

At 102, a request is received to evaluate security risks for a client-vendor relationship. According to various embodiments, such a due diligence request may be generated based on a request by a client. For instance, a client may review various vendors accessible via the security validation platform and then select a vendor for the purpose of creating a client-vendor relationship.

At 104, a vendor security profile is created. According to various embodiments, the creation of a vendor security profile may involve identifying, processing, analyzing, combining, or verifying vendor security profile information. In some instances, the creation of a vendor security profile may be omitted. For example, a vendor security profile may need to be created only at designated times, such as when a vendor joins the security validation platform for the first time, when the vendor institutes a change in security procedures, or at scheduled intervals, such as once per year.

According to various embodiments, security profile information may be identified in part by performing automated analysis via publicly accessible network connections such as the internet. For instance, the security platform may perform an external security analysis of the vendor's webpage, email server, or other such public-facing network interface.

In some implementations, security profile information may be identified in part by receiving question-response information explicitly provided by the vendor. For example, the vendor may provide free-form or discretized answers to any or all of a set of security-related questions, which may be standardized across vendors.

In some embodiments, security profile information may be identified in part by receiving documentation explicitly provided by the vendor or a third-party. For example, the vendor or a third-party such as an auditor may provide security-relevant documentary evidence such as screenshots, audit records, subcontractor contracts, or other such information.

In some implementations, the creation of a vendor security profile may involve performing automated risk analysis of the vendor security profile information. For example, the vendor security profile information may be used to establish a level of security on multiple dimensions. Then, those dimensions may be automatically graded on factors such as the level of security provided along that dimension, the weight or importance of that dimension, and the level of assurance or verification of the vendor security information associated with that dimension. Additional details regarding the identification of security profile information and the creation of a vendor security profile are discussed with respect to FIG. 3.

At 106, client-specific vendor security risk is determined. According to various embodiments, a client may interact with the security validation system to determine whether or not to engage a vendor. As part of this interaction, the client may specify the types of interactions contemplated between the client and vendor. These interactions may be used to automatically determine a client-specific information security risk associated with using the vendor. For example, the vendor security profile may include information such as whether the vendor encrypts sensitive information at rest in the vendor's computing infrastructure. However, the relevance of this dimension to a particular client may depend largely upon whether the client intends to provide sensitive information for storage on the vendor's computing infrastructure. Additional details regarding the determination of client-specific vendor security risk are discussed with respect to FIG. 4.

At 108, a risk assessment is sent to the client. In some implementations, sending the risk assessment to the client may involve providing a static or interactive report that presents various types of risk information associated with the client-vendor relationship. For instance, the report may include an overall risk level and/or specific risk levels associated with different risk dimensions.

At 110, a determination is made as to whether to conduct additional risk analysis. The determination may be made in part based on the client's response to the risk assessment information. For instance, if the client declines to interact with the vendor based on an inability to fully evaluate the risk based on the information available in the system, then the system may flag the vendor for additional risk analysis. The additional risk analysis may include operations such as collecting additional information, performing further manual analysis, or performing additional automated analysis.

Figure 2:
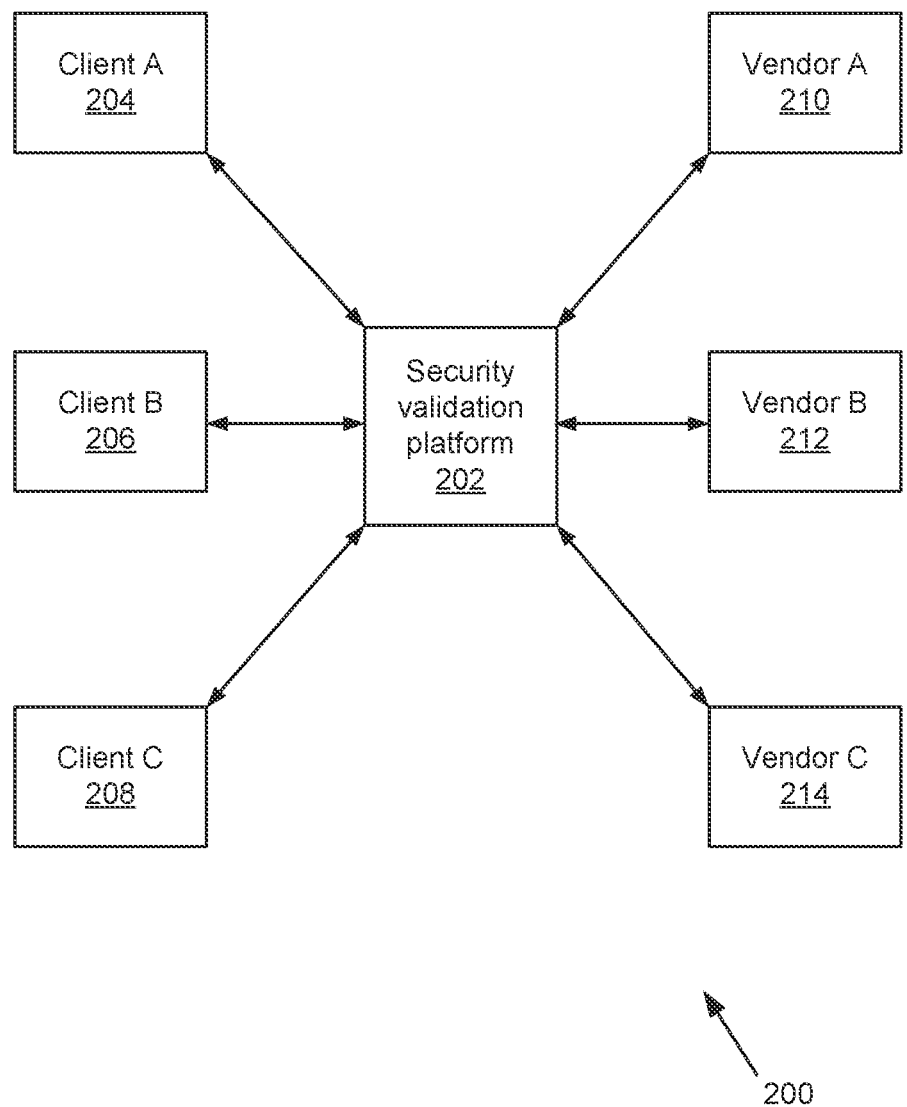
FIG. 2 illustrates an example of a security validation system, configured in accordance with one or more embodiments.

FIG. 2 shows an example of a security validation system 200. The security validation system 200 includes a security validation platform 202, clients 204, 206, and 208, and vendors 210, 212, and 214. The security validation platform 202 may be configured to perform various types of risk mediation operations for facilitating service relationships between clients and vendors. For example, the security validation platform 202 may be configured to perform the operations discussed with respect to FIG. 1, FIG. 3, FIG. 4, and FIG. 5.

At 210, a vendor is shown. According to various embodiments, the term "vendor" may refer to any business that provides services to other businesses and that may potentially deal with sensitive information. For example, a vendor may provide software-as-a-service (SAAS) in the form of data analysis or marketing. As another example, the vendor may provide a platform for accessing third-party services. As yet another example, a vendor may provide information technology services such as network or systems maintenance. As still another example, a vendor may provide legal services, such as representation in intellectual property matters. A vendor may interact with the security validation platform via one or more computing systems accessed via a network.

At 204, a client is shown. According to various embodiments, the term "client" may refer to any business or individual person who accesses services provided by a vendor. In some instances, an entity may be both a vendor and a client. For example, a SAAS firm may both provide services to other firms and may itself employ vendors such as information technology service providers or legal service providers. As another example, a law firm may provide legal services while also employing draftspersons, financial service providers, and other outside contractors. A client may interact with the security validation platform via one or more computing systems accessed via a network.

Figure 3:
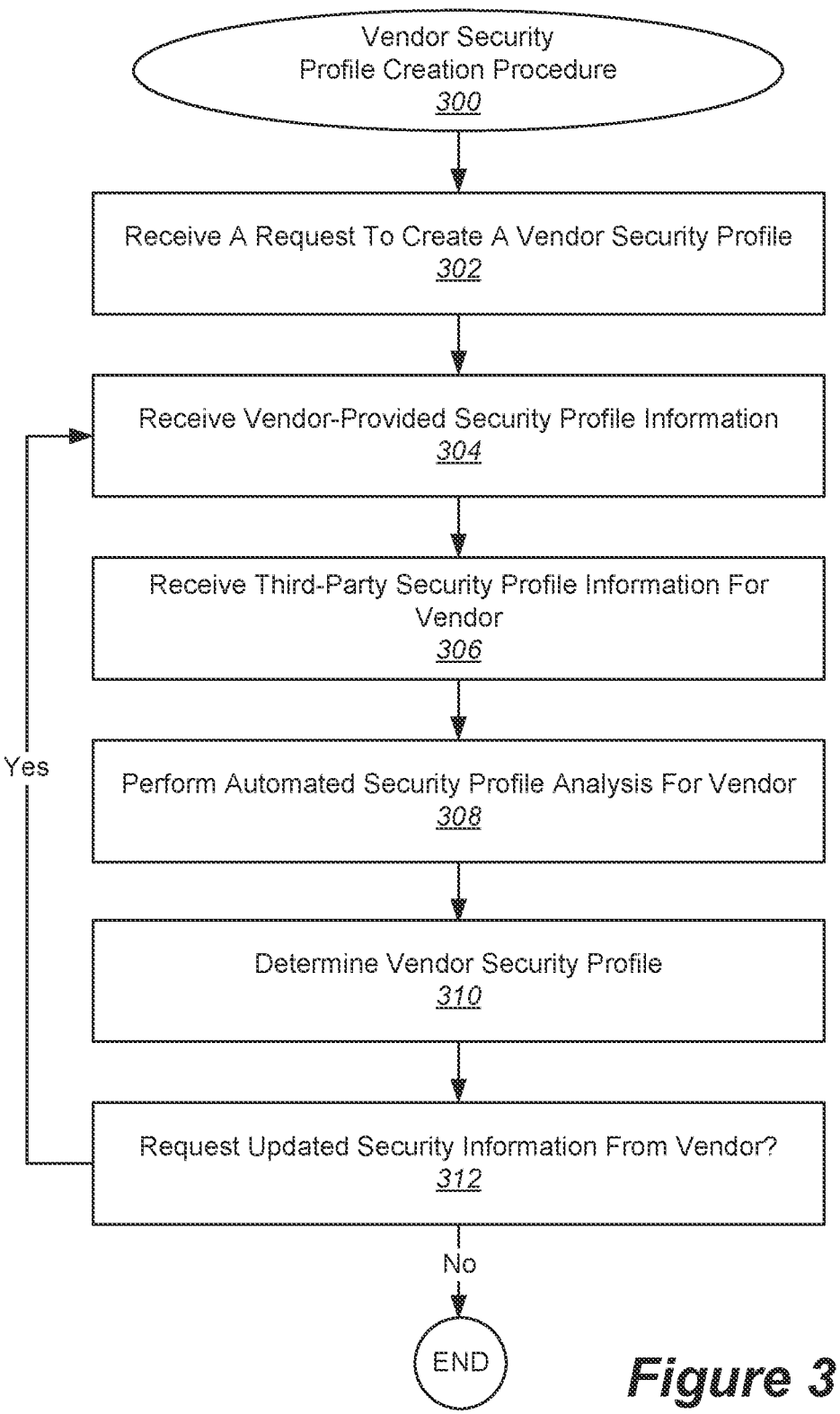
FIG. 3 illustrates an example of a process for creating a vendor risk profile.

FIG. 3 illustrates an example of a process 300 for creating a vendor risk profile. According to various embodiments, the process may be performed at a security validation platform such as the platform 202 shown in FIG. 2. At 302, a request to create a vendor security profile is received. The request may be generated based on any of a variety of triggering events. For instance, the request may be automatically generated when a vendor joins the security validation platform, when requested by a systems administrator, when a client requests an interaction with a vendor, when a designated period of time has elapsed since a profile for the vendor was previously updated, or at any other suitable time. In particular embodiments, a vendor risk profile may be updated annually, semi-annually, or quarterly.

At 304, vendor-provided security profile information is received. In some implementations, the vendor-provided security information may be received via user input provided in a webpage. For instance, the information may include free-form text, screenshots, images, or PDF or other documents.

According to various embodiments, the vendor-provided security profile information includes free-form or discrete answers to a set of standardized and version-controlled security audit questions that a qualified security professional responsible for security at the vendor organization has certified to be true and accurate as committed in the terms and conditions, which may be standardized for usage across any or all vendors who access the security validation platform. These questions incorporate concepts present in information industry best practice, standards, and regulations. The responses to these questions are predictive to the overall risk mitigation effectiveness. These questions will be continually refined, and new questions will be derived based on insights provided by existing internal data analysis, threat landscape changes, industry trends, and breach and threat incident data.

In particular embodiments, the vendor-provided security profile information may include reports from internally-deployed tools such as internal vulnerability scanning platforms. Examples of such tools include those provided by Qualys and Nexpose. Some such tools aggregate host vulnerability information, provide evidence that a vulnerability management program is in place, and indicate a level of effectiveness of the vulnerability management program.

At 306, third-party security profile information for the vendor is received. According to various embodiments, the third-party security profile information may be provided either by the vendor or received directly from a third party. The third-party security profile information may include independent security audit or compliance information. For example, the third-party security profile information may include one or more reports from a formal third-party Service Organization Control (SOC) audit, Payment Card Industry (PCI) Data Security Standards (DSS) audit, International Organization for Standardization (ISO) audit, or on any other security-relevant audit. As another example, the third-party security profile information may include one or more reports from an informal third-party audit, investigation, or digital analysis.

In some implementations, the third-party security profile information may be provided in a machine-readable tabularized format. Alternately, or additionally, third-party security profile information may be provided as a physical or scanned paper report. In some instances, third-party security profile information may be provided as a PDF or other file provided via a user interface on a webpage, such as a webpage provided by the security validation platform.

In particular embodiments, third-party security profile information may involve publicly available breach disclosure data. For example, many firms choose to disclose or are obligated to disclose incidences in which data security was breached. Such disclosures are often provided via publicly available repositories such as pastebin.com, github.com, privacy rights clearinghouses, the IDtheft Resource Center, security news feeds, or information releases by state or federal attorneys general. Collecting third-party security profile information may involve monitoring such repositories for breach data concerning specific vendors, including both recent breach data and historical breach data.

At 308, automated security profile analysis is performed for the vendor. In some implementations, automated security profile analysis may include any operations for collecting information about the security practices of the vendor in a machine-automated way. For instance, one or more website requests may reveal information such as whether communications with the vendor's website are encrypted via Secure Socket Layer (SSL) technology and whether the vendor's SSL security certificate is correctly formulated. As another example, a port scan of the vendor's web server may reveal inadvertently open network sockets or other misconfigurations. As still other examples, automated processes may perform operations such as automatically and periodically querying publicly available general content; examining the technical footprint and related configuration information from public facing infrastructure resources; querying open source threat research repositories and catalog references on public third party search and social media internet resources; querying public/government information sources; and/or querying security standards and benchmarking resources. The resulting data may then be aggregated, analyzed, and monitored.

In particular embodiments, performing automated security profile analysis may involve analyzing a vendor's connections to other vendors. For example, if vendor A receives services from vendor B who in turn receives services from vendor C, the security of these second, third, or nth order relationships may be considered when performing the automated security profile analysis. As an example of such a consideration, vendor A may report encrypting data at rest, while vendor B who provides services to vendor A may report not encrypted data at rest. If vendor A is sending sensitive client data to vendor B, then vendor A's security risk assessment may be downgraded based on the less stringent security practices of its sub-vendor (i.e. vendor B).

In particular embodiments, performing automated security profile analysis may involve analyzing corporate ownership or financial data such as stock price data, profitability data, corporate valuation data, data indicating changes to senior leadership, corporate governance board membership data, managed security services (MSS) provider relationship data, or other such information. Such information can be collected from sources such as the Bloomberg financial service, SEC filings, publicly available stock data, aggregated corporate health data constructed by corporate analysts, or other such sources. In some implementations, corporate ownership and financial data can be aggregated to produce an overall corporate health value that reflects a company's stability and profitability.

In particular embodiments, performing automated security profile analysis may involve analyzing corporate mergers and acquisitions data to inform organizational relationships and composite organizational risk. For example, suppose that limited data is available for company A. If company A is not affiliated with any other company, then company A may be assigned a risk profile indicating a relatively high level of risk. If instead company A is owned by or appears to be in the process of being purchased by a much larger company B that has a proven track record of good security practices, then the risk profile calculated for company A may reflect this relationship by reducing the level of risk for company A. Such corporate affiliation information may be collected from sources such as IP address ownership information, publicly available "whois" data that describes domain name registration and ownership, public internet number registry transfer record data, and traditional web-based sources for mergers and acquisitions information (e.g., crunchbase.com, dealbook.nytimes.com, blogs.wsj.com/deals, twitter.com/nytimesdealbook, twitter.com/wsjdealjournal, www.ft.com/indepth/m&a, www.themiddlemarket.com, www.reuters.com/finance/deals/mergers, and www.americanbanker.com.

At 310, a vendor security profile is determined. According to various embodiments, determining a vendor security profile may involve processing, analyzing, matching, or coordinating any or all of the information collected in operations 304, 306, and 308.

In particular embodiments, vendor-provided security information may be analyzed to establish a security rating on any of several security-related dimensions. For instance, a vendor may provide free-form text information about vendor procedures for enforcing multi-factor authentication for vendor platform administration. This text may then be analyzed using text recognition algorithms to classify the vendor's answer according to the level of security provided. Similarly, the text of third-party audit reports may be analyzed via text recognition algorithms to extract information related to particular security dimensions, such as whether the vendor encrypts data at rest on the vendor's systems.

In some implementations, collected information may be analyzed to coordinate different types of information. For instance, free-form text information about vendor procedures may be coordinated with third-party audit reports to determine whether an audit report supports, extends, or conflicts with the free-form text information. For example, a vendor may report that the vendor performs training for all employees on security procedures for identifying and avoiding phishing attacks. Text recognition algorithms may then be employed to search third party audit reports for supporting or contradicting evidence of such training.

In some implementations, the determination of the vendor security profile may involve determining a level of assurance for one or more risk dimensions. According to various embodiments, the level of assurance may indicate the likelihood that the estimated level of risk associated with the particular risk dimension is accurate. For example, a risk dimension for which a level of risk is assigned based solely on text information provided by the vendor may be assigned a low level of risk assurance. On the other hand, a risk dimension for which the vendor provides a formal, independent, third-party audit report that directly support's the vendor's claims may be assigned a high level of risk assurance.

According to various embodiments, the determination of the vendor security profile may involve identifying opportunities for improving an estimate of security associated with client-vendor interactions. For example, the security validation platform may identify opportunities to increase a level of assurance by providing additional documentation or to increase an estimated level of security by improving one or more security practices.

In some embodiments, a vendor security profile may be determined in part based on input provided by a security auditor. For example, an auditor may review information provided in a security audit or by the vendor and then provide an estimated level of security along a particular dimension. As another example, the auditor may request additional information from the vendor, such as additional verification through screenshots or audit reports. As yet another example, the auditor may provide feedback regarding steps the vendor might take to improve the vendor's security rating.

At 312, a determination is made as to whether to request updated security information for the vendor. In particular embodiments, the determination may be based at least in part on whether the collected information is adequate and/or inconsistent. For example, more information may be requested if the collected information fails to address one or more of a designated set of security analysis dimensions or if vendor-provided security information is contradicted by third-party audit information.

In some embodiments, the determination as to whether to request additional information may be based at least in part on the presence of security practice recommendations for improving a vendor's security profile. For example, the security validation system may automatically determine that the vendor's overall security rating could be improved by requiring two-factor authentication for systems administration. The security validation system may then notify the vendor of this information and request verification that the vendor has modified its systems to require such information.

In particular embodiments, one or more of the operations shown in FIG. 3 may be omitted or performed in a different order. For example, automated security profile analysis may not be performed for particular vendors. As another example, third-party security profile information may not be available for some vendors.

Figure 4:
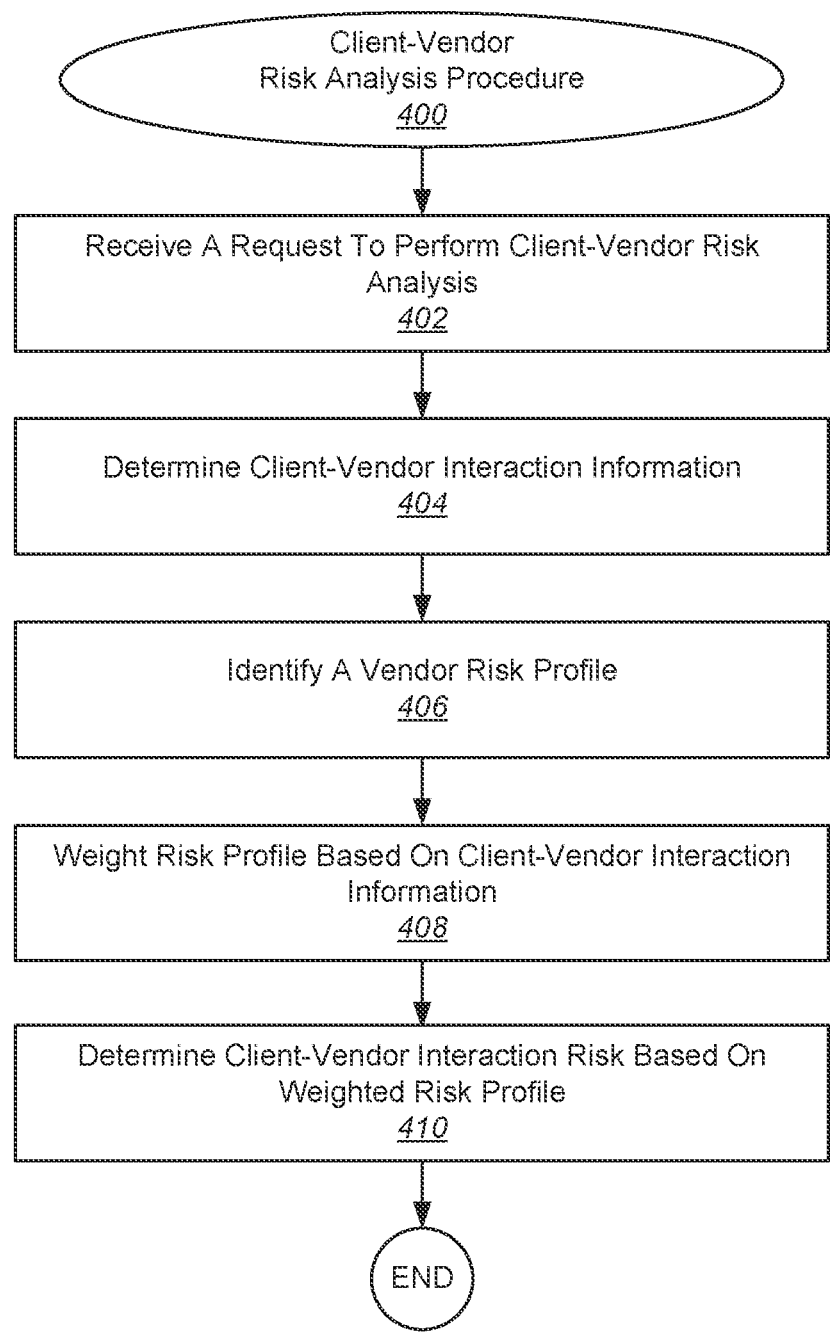
FIG. 4 illustrates an example of a process for performing client-vendor risk analysis.

FIG. 4 illustrates an example of a procedure 400 for performing client-vendor risk analysis. According to various embodiments, the procedure 400 may be performed at a security validation platform such as the platform 202 shown in FIG. 2. The procedure 400 may be performed in order to determine a level of information security risk associated with a contemplated or actual interaction between a particular client and a particular vendor. In particular embodiments, the procedure 400 may continue to be performed even after a client-vendor relationship is established, such as with a frequency of annually, semi-annually, or quarterly.

At 402, a request is received to perform client-vendor risk analysis. According to various embodiments, the request may be generated when a client indicates an interest in interacting with a vendor via the security validation platform. For example, the client may transmit a message that includes a request to receive risk assessment information associated with the vendor.

At 404, client-vendor interaction information is determined. In some implementations, client-vendor interaction information may provide an indication of the types of security procedures relevant to the services provided to the client by the vendor. For example, the vendor may or may not be receiving sensitive data from the client, storing sensitive data provided by the client, directly connecting the vendor's network with the client's, or physically visiting the client's location. As another example, the information transmitted from the client to the vendor may include relatively low security information such as source code, medium security information such as social security numbers, or relatively high security information such as encryption keys. As yet another example, the vendor may be using the client's own hardware infrastructure, the vendor's own hardware infrastructure, or a combination of the two.

In particular embodiments, client-vendor interaction information may be provided from a computing device associated with the client. For example, the client may transmit a standardized message or provide information via a web user interface that indicates the relevance of any of various dimensions of security to the client-vendor interaction. Such messages may be collected via free-text web form submission, document uploads, and emails. Relationship between free-text entries and specific documents may be provided via user interfaces or application programming interfaces. In some configurations, information may be collected by applying optical character recognition and national language processing techniques to documents.

At 406, a vendor risk profile is identified. According to various embodiments, a vendor risk profile may be created if one does not yet exist. However, a vendor may already have established a vendor risk profile, which may then be used to support risk analysis for providing services for potentially many different clients. Techniques for creating a vendor risk profile are discussed in greater detail with respect to FIG. 3.

At 408, the risk profile is weighted based on the client-vendor interaction information. For example, the risk profile may include a number of risk dimensions that each indicate a baseline level of information security risk associated with interacting with the vendor. Such risk dimensions may include vendor employee training procedures, vendor systems administration authentication procedures, vendor data transmission encryption standards, vendor data storage encryption standards, vendor employee background check procedures, and other such factors. Each risk dimension may be associated with a baseline weight indicating the general relevance of the risk dimension to an overall risk calculation.

In some instances, a particular client-vendor interaction may result in a different weight being applied. For example, if a client-vendor interaction involves the vendor using the client's hardware rather than the vendor's hardware and involves the vendor visiting the client's physical location, then dimensions such as vendor background check procedures and vendor employee training procedures may be upweighted while dimensions such as vendor data storage encryption standards or vendor systems administration authentication procedures may be downweighted. As another example, if a client-vendor interaction involves the vendor receiving and storing highly sensitive information from the client on the vendor's own systems, then dimensions such as vendor background check procedures and vendor employee training procedures may be downweighted while dimensions such as vendor data storage encryption standards or vendor systems administration authentication procedures may be upweighted. As yet another example, a level of assurance associated with a dimension in the vendor's risk profile may affect the weight. For instance, if a particular dimension is very important to a client-vendor interaction and the corresponding information in the vendor profile is not supported with documentary evidence, then the weight of the dimension may be increased.

In particular embodiments, a risk profile may be weighted based on a vendor's connections to other vendors. For example, if vendor A receives services from vendor B who in turn receives services from vendor C, the security of these second, third, or nth order relationships may be considered when performing the automated security profile analysis. As an example of such a consideration, vendor A may report encrypting data at rest, while vendor B who provides services to vendor A may report not encrypted data at rest. However, the impact of these sub-vendor relationships may depend on the type of relationship between a client and a vendor. If the client does not contemplate sending sensitive data to vendor A or if vendor A does not contemplate sending the clients data to vendor B, then whether vendor B encrypts data at rest may have little or no effect on the security assessment of the relationship between vendor A and vendor B. Alternately, if the client's data is likely to pass through to vendor B, then the security practices in place at vendor B may be upweighted.

At 410, a level of client-vendor interaction risk is determined based on the weighted risk profile. According to various embodiments, the client-vendor interaction risk may be determined by combining the weighted risk levels estimated for different dimensions. For example, a weighted average of the risk levels estimated for different dimensions may be calculated to produce an overall information security risk level associated with the interaction.

In particular embodiments, the client-vendor interaction risk may then be provided to the client and/or the vendor. For instance, the security validation platform may transmit to the client and/or the vendor a risk assessment message that describes an estimated overall level of information security risk. The risk assessment message may also include information about weightings, assurance levels, and/or estimated risks associated with one or more risk dimensions. For instance, the risk assessment message may highlight a dimension of risk that is particularly influential to the overall risk estimate calculation.

According to various embodiments, various types of information may be provided to the client. In a first example, the client may be provided with high-level security analysis results such as estimated risk levels. In a second example, the client may be provided with vendor responses to standardized security audit questions. In a third example, the client may be provided with third-party audit documentation resulting from formal third-party audits of the vendor's security practices. In some instances, the vendor may need to specifically authorize a client to access particular types of information security risk assessment or documentation information.

In some implementations, the platform may automate the dissemination and acceptance of two-party or multi-party non-disclosure agreements or other such contracts that involve the sharing of source materials and security profiles. For example, each client and/or vendor may be presented with a mutual non-disclosure agreement between the client and the security platform. Such a non-disclosure agreement may be presented and signed when a client and/or vendor initially registers with the security platform, when the non-disclosure agreement is updated, or at any other suitable time.

In some embodiments, a client may be presented with a three-way non-disclosure agreement when requesting to access a potential vendor's security profile. The agreement may require, for example, the client to maintain the confidentiality of the information available in the vendor's security profile. The agreement may also allow the security platform to extend the agreement to the vendor on the client's behalf.

In some embodiments, a vendor may be presented with a three-way non-disclosure agreement when receiving a request to access the vendor's security profile from the client. For example, the agreement may authorize the platform to share the vendor's security profile information with the client while at the same time requiring each party to maintain the confidentiality of the information included in the security profile as well as any other private information about the platform, the vendor, or the client.

Figure 5:
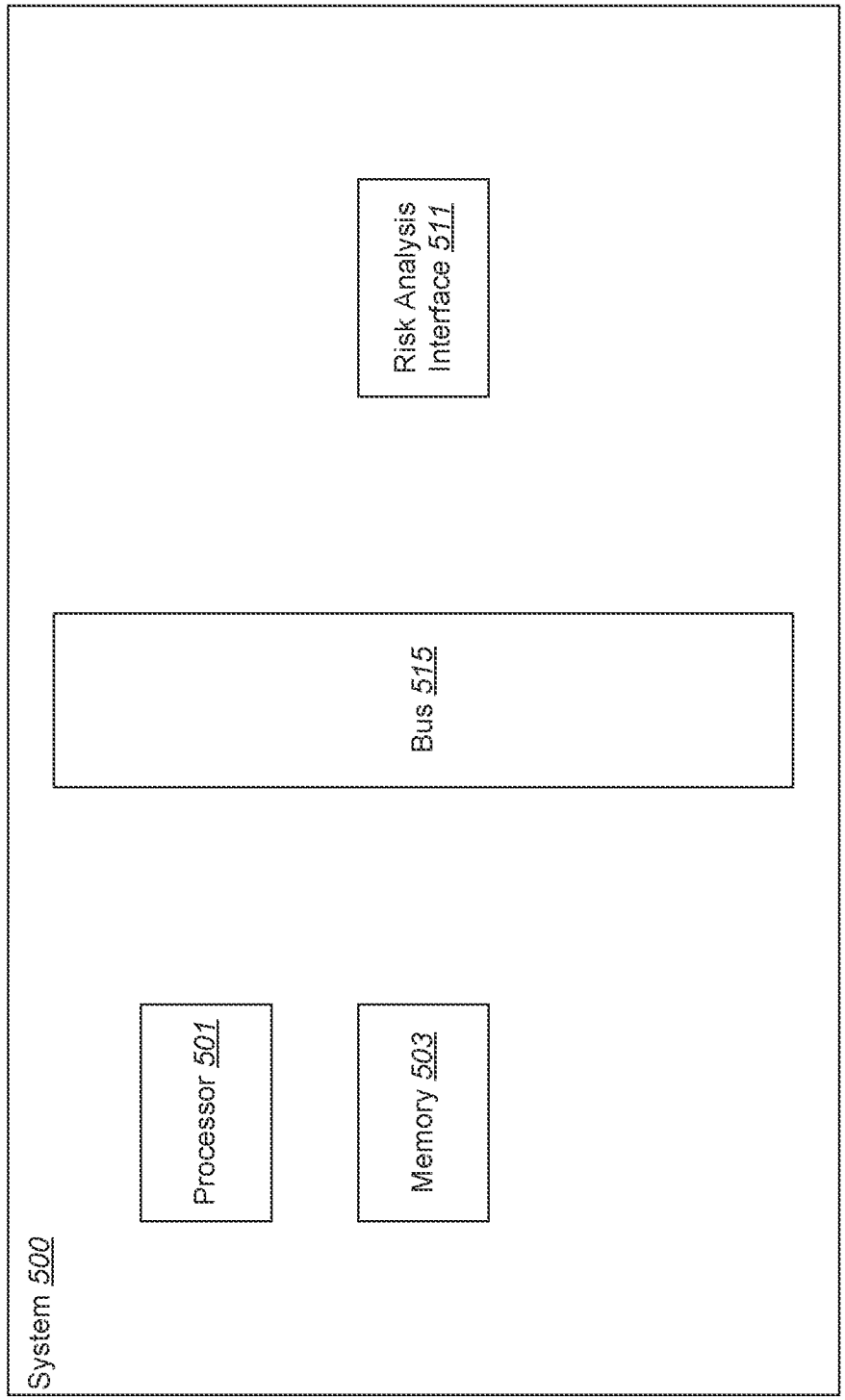
FIG. 5 illustrates a particular example of a computer system that can be used with various embodiments of the present invention.

With reference to FIG. 5, shown is a particular example of a computer system that can be used to implement particular examples of the present invention. For instance, the computer system 500 can be used to perform security profile generation, risk evaluation, and risk intermediation, according to various embodiments described above. In particular example embodiments, a system 500 suitable for implementing particular embodiments of the present invention includes a processor 501, a memory 503, risk analysis interface 511, and a bus 515 (e.g., a PCI bus). The risk analysis interface 511 may include separate input and output interfaces, or may be a unified interface supporting both operations. When acting under the control of appropriate software or firmware, the processor 501 is responsible for such tasks such as optimization. Various specially configured devices can also be used in place of a processor 501 or in addition to processor 501. The complete implementation can also be done in custom hardware. The risk analysis interface 511 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces, and the like. Generally, these interfaces may include ports appropriate for communication with the appropriate media. In some cases, they may also include an independent processor and, in some instances, volatile RAM. The independent processors may control such communications-intensive tasks as packet switching, media control, and management.

According to particular example embodiments, the system 500 uses memory 503 to store data and program instructions and maintain a local side cache. The program instructions may control the operation of an operating system and/or one or more applications, for example. The memory or memories may also be configured to store received metadata and batch-requested metadata.

Figure 6:
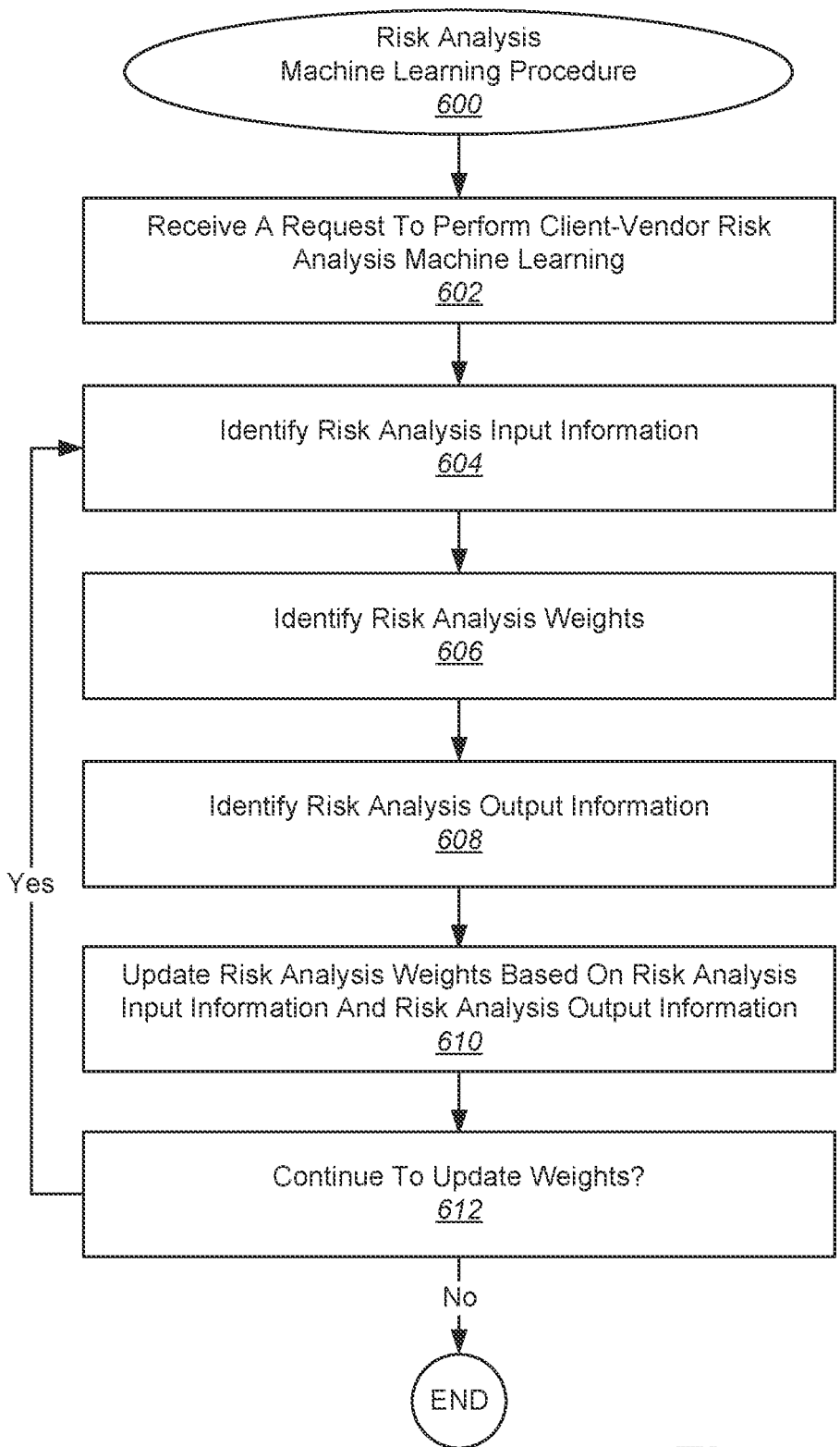
FIG. 6 illustrates a particular example of a process for risk analysis machine learning.

FIG. 6 illustrates an example of a risk analysis machine learning procedure 600. According to various embodiments, the procedure 600 may be used to update weights or other risk analysis factors to facilitate the automatic or machine-assisted analysis of risk analysis input information.

At 602, a request to perform client-vendor risk analysis machine learning is received. According to various embodiments, the request may be generated manually by a systems administrator or may be generated automatically, for instance at periodic intervals.

Next, risk analysis input information is identified at 604. In some implementations, the risk analysis input information may include any of various types of information associated with risk analysis. For example, the risk analysis input information may include free-form text responses to standardized security questions, documentary evidence such as standardized third-party audit reports, or security risk estimates assigned to different dimensions of information security risk. In particular embodiments, the risk analysis input information may be associated with a particular vendor, client, or vendor-client interaction.

Then, risk analysis weights are identified at 606. According to various embodiments, the risk analysis weights may include any machine-estimated weights for converting risk analysis input information to risk analysis output information. For instance, the risk analysis weights may each be associated with a risk dimension, a particular type of input data such as a particular field on a SOC compliance audit report, or a weight that reflects the importance of a risk dimension to a particular type of client-vendor interaction. The risk analysis weights may be initially set to a default value and then updated iteratively based on the machine learning analysis.

At 608, risk analysis output information is identified. In some embodiments, the risk analysis output information may include objective outcomes against which the identified risk analysis weights are evaluated. For example, the risk analysis output information may include information security outcomes associated with particular client-vendor interactions. As another example, the risk analysis output information may include risk estimates assigned by human auditors.

At 610, the risk analysis weights are updated based on the risk analysis input information and the risk analysis output information. According to various embodiments, the risk analysis weights may be updated by predicting the risk analysis output information from the risk analysis input information. If a different set of weights would predict the output information better than the previous set of weights, then the previous weights may be adjusted so that they would yield better predictions of the risk analysis output information.

At 612, a determination is made as to whether to continue to update weights. According to various embodiments, the determination may be made at least in part upon factors such as whether recent iterations of the procedure have yielded weights that provide predictions that more closely match the actual risk analysis output information and whether additional input or output information is available for analysis.

Because such information and program instructions may be employed to implement the systems/methods described herein, the present invention relates to tangible, machine-readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

The invention claimed is:

1. A method comprising:
receiving security practices information at a communications interface from a vendor computing system via a network, wherein the security practices information characterizes security measures in place at the vendor computing system;
receiving computing services interaction information at the communications interface from a client computing system via the network, wherein the computing services interaction information characterizes data for transmission from the client computing system to the vendor computing system;
determining a risk profile for the vendor computing system by using a processor to analyze third-party audit information documenting the result of an audit of security measures associated with the vendor computing system, wherein the processor is configured to access security practices information associated with a plurality of vendors providing computing services, wherein determining the risk profile comprises estimating a dimensional risk factor for each of a plurality of security dimensions associated with the security practices information;

determining based on the risk profile and the computing services interaction information, an estimate of an information security risk associated with transmitting the data from the client computing system to the vendor computing system;

transmitting a risk assessment message to the client computing system, the risk assessment message including the estimate of the information security risk, where the risk assessment is client-specific to the client computing system and depends on the type of information to be transmitted to the vendor computing system; and detecting a change in security practices information at the vendor computing system, wherein a weight to a first dimensional risk factor corresponding to a first security dimension associated with security practices information is adjusted at the processor based on the change in security practices information.

2. The method of claim 1, wherein an updated risk assessment message is transmitted to the client computing system, the updated risk assessment message including an updated estimate of the information security risk.

3. The method of claim 1, wherein the dimensional risk factor reflects a reported security practice associated with the security dimension, the dimensional risk factor reflecting a level of assurance associated with the reported security practice, and wherein determining the risk profile comprises calculating a weighted average of the dimensional risk factors.

4. The method of claim 3, wherein determining the estimate of the information security risk comprises determining a weighting value for each of the dimensional risk factors based on the computing services interaction information, the weighting reflecting a relative importance of the dimensional risk factor to the estimate of the information security risk.

5. The method of claim 4, wherein determining the risk profile comprises applying natural language processing to free-form text information to determine a respective dimensional risk level.

6. The method of claim 4, wherein the computing services interaction information includes a data sensitivity level associated with the transmitted data.

7. The method of claim 4, wherein determining the risk profile comprises matching the third-party audit information with the free-form text information using natural language processing.

8. The method of claim 4, wherein the security practices information comprises information characterizing a user authentication procedure and an encryption algorithm employed at the first computing device.

9. The method of claim 4, wherein the risk profile is determined in part based on automated security analysis performed by transmitting a security practice detection message to the first computing device, the security practice detection message being designed to test the security measures in place at the first computing system.

10. The method of claim 4, wherein the first computing system is associated with a designated one of a plurality of vendors, and wherein the second computing system is associated with a designated one of a plurality of clients.

11. A system comprising:

a input interface configured to receive security practices information from a vendor computing system via a network, wherein the security practices information characterizes security measures in place at the vendor computing system, the input interface further configured to receive computing services interaction information from a client computing system via the network, wherein the computing services interaction information characterizes data for transmission from the client computing system to the vendor computing system;

a processor configured to determine a risk profile for the vendor computing system by analyzing third-party audit information documenting the result of an audit of security measures associated with the vendor computing system, wherein the processor is configured to access security practices information associated with a plurality of vendors providing computing services, wherein determining the risk profile comprises estimating a dimensional risk factor for each of a plurality of security dimensions associated with the security practices information, wherein the processor is further configured to determine based on the risk profile and the computing services interaction information, an estimate of an information security risk associated with transmitting the data from the client computing system to the vendor computing system; and an output interface configured to transmit a risk assessment message to the client computing system, the risk assessment message including the estimate of the information security risk, where the risk assessment is client-specific to the client computing system and depends on the type of information to be transmitted to the vendor computing system;

wherein a change in security practices information is detected at the vendor computing system, wherein a weight to a first dimensional risk factor corresponding to a first security dimension associated with security practices information is adjusted based on the change in security practices information.

12. The system of claim 11, wherein an updated risk assessment message is transmitted to the client computing system, the updated risk assessment message including an updated estimate of the information security risk.

13. The system of claim 11, wherein the dimensional risk factor reflects a reported security practice associated with the security dimension, the dimensional risk factor reflecting a level of assurance associated with the reported security practice, and wherein determining the risk profile comprises calculating a weighted average of the dimensional risk factors.

14. The system of claim 13, wherein determining the estimate of the information security risk comprises determining a weighting value for each of the dimensional risk factors based on the computing services interaction information, the weighting reflecting a relative importance of the dimensional risk factor to the estimate of the information security risk.

15. The system of claim 14, wherein determining the risk profile comprises applying natural language processing to free-form text information to determine a respective dimensional risk level.

16. The system of claim 14, wherein the computing services interaction information includes a data sensitivity level associated with the transmitted data.

17. The system of claim 14, wherein determining the risk profile comprises matching the third-party audit information with the free-form text information using natural language processing.

18. The system of claim 14, wherein the security practices information comprises information characterizing a user authentication procedure and an encryption algorithm employed at the first computing device.

19. The system of claim 14, wherein the risk profile is determined in part based on automated security analysis performed by transmitting a security practice detection message to the first computing device, the security practice detection message being designed to test the security measures in place at the first computing system.

20. A non-transitory computer readable medium comprising:
- computer code for receiving security practices information at a communications interface from a vendor computing system via a network, wherein the security practices information characterizes security measures in place at the vendor computing system;
- computer code for receiving computing services interaction information at the communications interface from a client computing system via the network, wherein the computing services interaction information characterizes data for transmission from the client computing system to the vendor computing system;
- computer code for determining a risk profile for the vendor computing system by using a processor to analyze third-party audit information documenting the result of an audit of security measures associated with the vendor computing system, wherein the processor is configured to access security practices information associated with a plurality of vendors providing computing services, wherein determining the risk profile comprises estimating a dimensional risk factor for each of a plurality of security dimensions associated with the security practices information;
- computer code for determining based on the risk profile and the computing services interaction information, an estimate of an information security risk associated with transmitting the data from the client computing system to the vendor computing system;
- computer code for transmitting a risk assessment message to the client computing system, the risk assessment message including the estimate of the information security risk, where the risk assessment is client-specific to the client computing system and depends on the type of information to be transmitted to the vendor computing system; and
- computer code for detecting a change in security practices information at the vendor computing system, wherein a weight to a first dimensional risk factor corresponding to a first security dimension associated with security practices information is adjusted at the processor based on the change in security practices information.

* * * * *